United States Patent [19]

Grosseau

[11] 4,077,232

[45] Mar. 7, 1978

[54] MEANS FOR THE SECURING, IN A CYLINDRICAL MEMBER, OF A CIRCULAR DISCOID MEMBER

[75] Inventor: Albert Grosseau, Chaville, France

[73] Assignee: Societe Anonyme Automobiles Citroen, France

[21] Appl. No.: 642,596

[22] Filed: Dec. 19, 1975

[30] Foreign Application Priority Data

Dec. 27, 1974 France .................. 74 43081

[51] Int. Cl.² ............................................. F16D 1/06
[52] U.S. Cl. .................................. 64/11 R; 403/326; 403/359
[58] Field of Search ............ 64/11, 27 NM; 403/326, 403/DIG. 6, 315; 285/321

[56] References Cited

U.S. PATENT DOCUMENTS

| | | | |
|---|---|---|---|
| 1,594,476 | 8/1926 | Smith | 287/135 X |
| 2,884,240 | 4/1959 | Loughlin | 64/15 B |
| 2,924,082 | 2/1960 | Reich | 64/10 |
| 3,297,344 | 1/1967 | Hanes | 285/321 |
| 3,531,144 | 9/1970 | Bizilia | 403/326 |
| 3,650,182 | 3/1972 | Phillips | 285/321 |
| 3,865,499 | 2/1975 | Flichy | 403/326 |

FOREIGN PATENT DOCUMENTS 327,841  2/1958  Switzerland.

*Primary Examiner*—Benjamin W. Wyche
*Assistant Examiner*—R. C. Turner
*Attorney, Agent, or Firm*—Stevens, Davis, Miller & Mosher

[57] ABSTRACT

A circular discoid member is secured in a cylindrical member by means of a resilient split ring received in an annular groove formed in the internal surface of the cylindrical member. The resilient ring projects radially inwardly into engagement with an abutment zone of a peripheral surface of the circular member to retain the circular member against a biasing force applied thereto in one axial direction, while permitting displacement of the circular member in the other axial direction. A peripheral surface portion of the circular member on the opposite side of the resilient ring to the abutment zone has a diameter less than the internal diameter of the resilient ring when received in the groove and at least equal to the internal diameter of the ring when compressed for introduction into the cylindrical member. The circular member is displaceable relative to the cylindrical member in the said other axial direction by an amount enabling the resilient ring to be retracted radially out of the groove of the cylindrical member.

7 Claims, 4 Drawing Figures

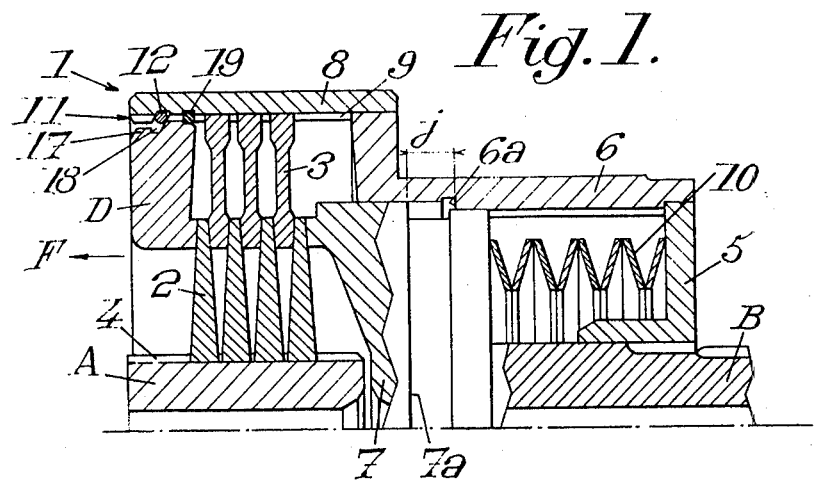
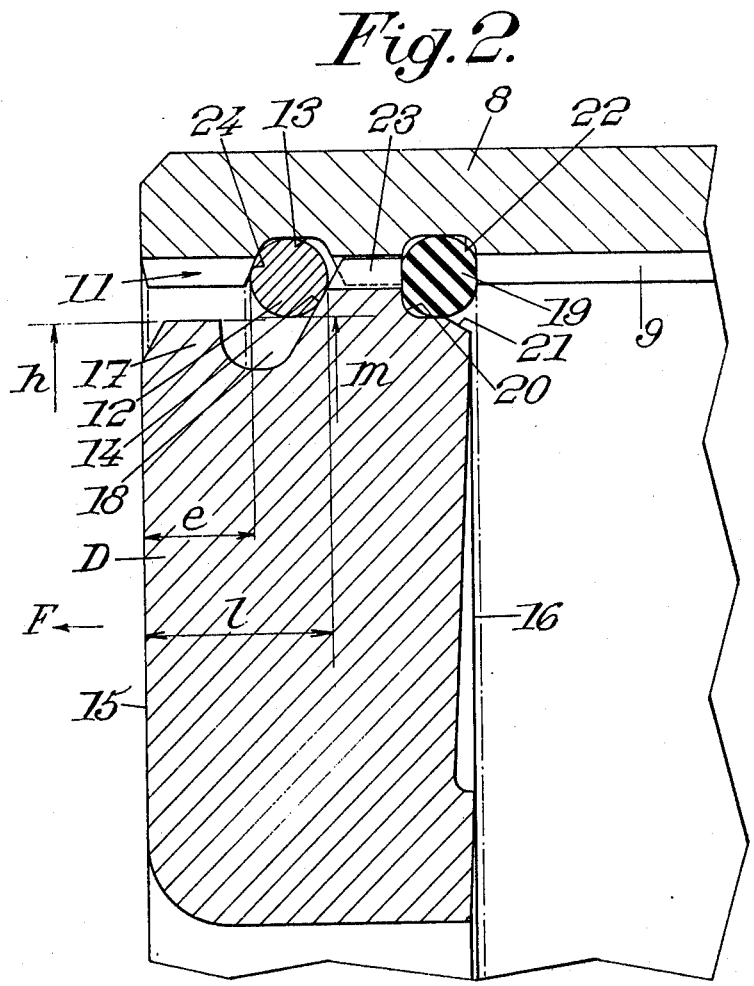

MEANS FOR THE SECURING, IN A CYLINDRICAL MEMBER, OF A CIRCULAR DISCOID MEMBER

BACKGROUND OF THE INVENTION

This invention relates to the securing, in a cylindrical member, of a circular discoid member subjected to an axial force in one direction.

The invention is concerned with an assembly of the kind comprising a resilient split ring received in an annular groove formed in the internal surface of the cylindrical member and projecting radially inwardly for engagement with an abutment zone of a peripheral surface of the circular member to retain the circular member against the said axial force, the circular member being displaceable in the cylindrical member, in the other axial direction, by a sufficient opposing axial force, the ring being completely disposed between end faces of the circular member when the resilient ring is in engagement with the abutment zone of the peripheral surface of the circular member.

It is an object of the invention to provide an assembly of the kind described which performs better in practice than the known devices, inter alia by facilitating disassembly of the resilient ring and production of the complete system.

SUMMARY OF THE INVENTION

According to the invention, in an assembly as hereinbefore described, said circular member has a peripheral surface portion which has a diameter less than the internal diameter of the resilient ring when said ring is received in the annular groove of the cylindrical member and at least equal to the internal diameter of the ring when said ring is in a compressed condition for introduction into the cylindrical member, said peripheral surface portion being disposed between the abutment zone and one end face of the circular member which is on the axial side of the resilient ring remote from the abutment zone; and the circular member is axially displaceable relative to the cylindrical member in said other direction by an amount enabling the resilient ring to be retracted radially inwardly of the cylindrical member out of the annular groove of the cylindrical member.

Preferably, the said peripheral surface portion of the circular member is formed with a groove adjacent the abutment zone, the depth of said groove in the circular member being such as to enable the circular member to be introduced into the cylindrical member with the resilient ring retained in the groove of the circular member.

Advantageously, to provide sealing-tightness between the circular member and the cylindrical member said cylindrical member is formed with a further groove and a second portion of the peripheral surface of said circular member adjacent the other and face of said circular member is formed with an axially open recess, the assembly comprising a ring gasket received in said further groove of said cylindrical member and projecting inwardly of the internal surface of said cylindrical member for engagement in said recess of said circular member.

Advantageously, said circular member has a chamfer at the open axial end of said recess of said second peripheral surface portion to facilitate engagement of said ring gasket in said recess on introduction of said circular member into said cylindrical member.

The invention relates more particularly to the application of an assembly as hereinbefore described to a variable-speed device comprising a driving shaft, a driven shaft and a stack of variable thickness composed of conical discs and annular rings disposed in alternate relationship, the discs rotating with the driving shaft by way of splines on the driving shaft, the rings rotating with the cylindrical member which itself rotates with the driven shaft, the circular member rotating with the cylindrical member through the agency of cooperating splines on the members, the splines of the circular member being disposed on the peripheral surface thereof on the same axial side of the resilient ring as the abutment zone, resilient means being provided to produce an axial force for clamping the stack of discs and rings against the circular member which is retained in the cylindrical member by the assembly according to the invention.

BRIEF DESCRIPTION OF THE DRAWINGS

In order that the invention may be readily understood, an embodiment thereof will now be described, by way of example, with reference to the accompanying drawings, in which:

FIG. 1 is a diagrammatic view in axial section, with parts outside, of a variable-speed device including an assembly embodying the invention;

FIG. 2 is a view in section and on a larger scale of a detail of FIG. 1 concerning the assembly of the circular and cylindrical members.

DESCRIPTION OF PREFERRED EMBODIMENT

Figure 3:
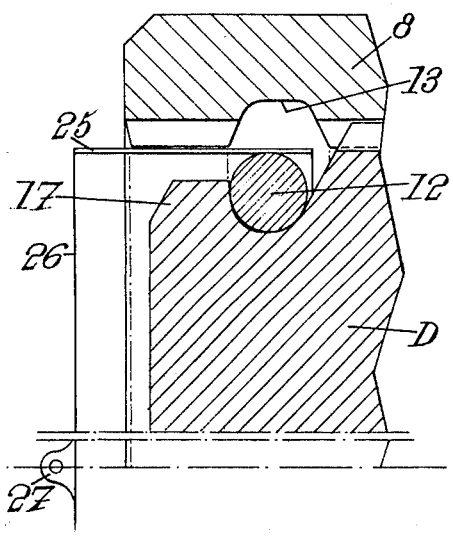
FIGS. 3 and 4 show phases in the assembling and disassembling of the assembly of circular and cylindrical members.

Referring to FIG. 1 of the drawings, a variable-speed device 1 is disposed between a driving shaft A and a driven shaft B and comprises a stack of variable thickness composed of conical discs 2 and annular rings 3, the discs 2 and rings 3 being arranged in alternate relationship. The discs 2 are non-rotatably mounted on shaft A through the agency of splines 4 on which the discs 2 can slide.

A cover 5 is disposed around shaft B and can slide axially thereon. The cover 5 is secured by way of its periphery to the end of a sleeve 6 rotating with shaft B.

At the end near shaft A, shaft B has an enlarged part 7 which is rigidly secured to shaft B and which serves as an abutment for one end of the stack embodied by the discs 2 and ring 3. At the end remote from cover 5 the sleeve 6 has a cylindrical portion or member 8 of greater diameter than the sleeve part disposed near the cover 5. Member 8, which is rigidly secured to sleeve 6, has internal splines 9 to provide a connection with the rings 3 such that the same cannot rotate relative to the sleeve 6 but can slide axially.

At the end remote from sleeve 6 the cylindrical member 8 is closed by a circular discoid member D which is secured inside the member 8. Member D forms a second abutment for the stack of discs 2 and rings 3 and experiences an axial force F tending to move it out of members 8, such force F being produced by a number of resilient compression discs 10 which are disposed around the driven shaft B and which bear at one end on cover 5 and at the other end on the enlarged part 7 of shaft B.

Securing means 11 for the member D comprises a resilient metal split ring 12 received in an annular groove 13 formed in the internal surface of cylindrical member 8. The depth of groove 13 is substantially equal to the radius of the circular cross-section of ring 12, so that the latter projects radially inwardly from the inner wall of member 8, as can be seen clearly in FIG. 2. The projecting part of ring 12, which can be made inter alia of steel, is adapted to retain the circular member D which bears on ring 12 by way of an abutment zone 14 of its peripheral surface.

Member D can slide in the cylindrical member 8 in the opposite direction to the axial force F — i.e. towards the right in FIG. 1 of the drawings. Accordingly, when member D is in abutting engagement with ring 12, there is an axial clearance $j$ (FIG. 1) between two transverse abutments surfaces 7a, 6a on the enlarged part 7 of shaft B and on sleeve 6, respectively, the latter surfaces limiting the relative movement of member D in the direction opposite to the direction of the axial force F. When the assembly is in the assembled condition shown in FIGS. 1 and 2, the metal ring 12 is positioned axially between end faces 15 and 16 of member D. That edge of ring 12 which is near the open end of the cylindrical member 8 is separated by a distance $e$ (FIG. 2) from the disc end face 15.

That part 17 of the circular member D which is disposed on the axial side of ring 12 remote from abutment zone 14 has a diameter $h$ (FIG. 2) which is less than the internal diameter $m$ of the ring 12 when received in groove 13 and at least equal to the internal diameter of ring 12 when in a compressed condition for introduction into the cylindrical member 8. The amplitude of possible relative axial sliding between members D and 8, which can be produced by a force opposing the axial force F and greater in absolute value than the latter force, is such that the ring 12 can be retracted radially inwardly of the member 8 out of the groove 13.

To this end, the axial clearance $j$ (FIG. 1) which is present between the transverse abutment surfaces 7a and 6a when the member D is in abutment with ring 12 is greater than the distance $l$ (FIG. 2) between the inside edge of the ring and the end face 15 of member D.

Member D is formed with an annular groove 18 which is adjacent abutment zone 14 and which, in the assembled condition, is disposed in substantially the same axial area as the annular groove 13. Preferably, the groove 18 is deep enough to permit complete retraction therein of ring 12, the outside edge thereof having a diameter smaller than the smallest internal diameter of member 8. Consequently, and as will be described hereinafter, the member D having the ring 12 in its groove 18 can be introduced into the member 8.

Sealing-tightness between the members 8 and D is taken care of by a ring gasket 19 made inter alia of an elastomer and received in an annular recess 20 in the peripheral surface of member D adjacent the inner end face 16 of the circular member D.

The end face 16 has a frustoconical chamfer 21 at the axial end of recess 20, which recess is open towards the inside of the member 8, to facilitate the positioning of gasket 19. In cross-section the recess 20 has the shape of a right-angle with the concavity facing towards the inside of the cylindrical member 8, the apex of the right-angle being rounded.

The cylindrical member 8 is formed with another groove 22 which is disposed further inwards of the member 8 than the groove 13 so as to be disposed axially near the recess 20 when the member D is retained in member 8 by ring 12. The cross-section of gasket 19 is determined by the gasket-receiving area embodied by the groove 22 and recess 20 with a predetermined compression, the gasket 19 bearing on the various surfaces which bound the zone where it is received.

The internal splines of member 8 extend beyond groove 22 between the same and the groove 13, and beyond the groove 13, as can be seen in FIG. 2.

The member D has splines 23 between groove 18 and recess 20, the splining 23 cooperating with the splines 9 so that the members D and 8 rotate rigidly with one member.

The abutment zone 14 is embodied by a frustoconical surface which has the same axis as the member D and whose convexity faces in the direction of the force F. The zone 24 via which groove 13 abuts ring 12 is also embodied by a conical surface which extends in the same direction as the surface 14, these two conical surfaces converging towards the axis of the member D.

The depths of the splines 9, 23 are such that the contact lines which the ring 12 makes with the abutment zones 14, 24 are continuous.

A description will now be given of how the two members 8 and D are assembled and disassembled.

For assembly, and as shown in FIG. 3, the metal ring 12 is preferably clamped against the bottom of groove 18 by means of a cylindrical tool 25 which has a rear cross-member 26 having gripping means 27, such as lugs. Before member D is introduced into member 8, gasket 19 is positioned in groove 22 which surrounds gasket 19 externally. Member D is then introduced into member 8, the outer diameter of tool 25 being less than the smallest internal diameter of member 8, something which is possible because of the adequate depth of groove 18.

When the ring 12 is axially near the groove 13, the cylindrical tool 25 is withdrawn while the member D is retained. The ring 12 expands under its natural resilience and engages in groove 13. During this introduction of member D, gasket 19 has engaged in recess 20 (FIG. 2).

Figure 4:
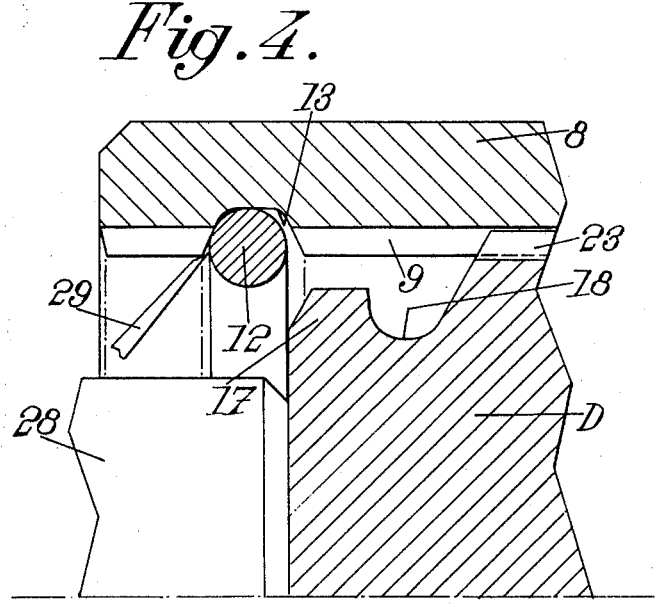

To disassemble ring 12, member D is pushed towards the inside of member 8 against the force F applied by the resilient means 10. The push can be provided by a press ram 28, as shown in FIG. 4. The member D is moved axially so that the ring 12 is released radially inwards. Once the ring 12 has been thus released, a sharp-pointed tool 29, such as a marking point, is introduced between groove 13 and ring 12, in the manner visible in FIG. 4, to prise the ring 12 out right around the groove 13, starting with that part of the ring which is near the split therein. The gasket 19 must be replaced after each disassembly operation.

The assembly embodying the invention makes for ready installation and removal of the ring 12. The member D can be made relatively thick since it can extend by a distance $e$ beyond the outside edge of ring 12 (FIG. 2). Because of its thickness, the member D can have satisfactory inertia and strength without any further complications in assembly and disassembly operations. Indeed, the assembling operation illustrated in FIG. 3 is made easier because the ring 12 can be retained in the groove 18 due to the presence of the part 17, which is simple to machine.

I claim:
1. An assembly comprising: a cylindrical member having an internal surface formed with an annular groove; a circular discoid member received in said cylindrical member, said circular member having two end faces and a peripheral surface formed with an abutment zone; and a resilient split ring received in the groove of said cylindrical member and projecting inwardly of the internal surface of said cylindrical member for engagement with the abutment zone of the peripheral surface of said circular member to retain said circular member against an axial force applied thereto in one direction while permitting axial displacement of said circular member in the other direction by a sufficient opposing axial force acting in said other direction, said resilient ring being disposed completely between the end faces of said circular member when said resilient ring is in engagement with the abutment zone of the peripheral surface of said circular member; in which assembly the improvement comprises: said circular member having a peripheral surface portion which has a diameter less than the internal diameter of said resilient ring when said ring is received in the annular groove of said cylindrical member and at least equal to the internal diameter of said resilient ring when said ring is in a compressed condition for introduction into said cylindrical member, said peripheral surface portion being disposed between the abutment zone and one end face of said circular member which is on the axial side of said resilient ring remote from the abutment zone; and said circular member being axially displaceable relative to said cylindrical member in said other direction by an amount enabling said resilient ring to be retracted radially inwardly of said cylindrical member out of the annular groove of said cylindrical member.

2. An assembly as claimed in claim 1, wherein said peripheral surface portion of said circular member between the abutment zone and said one end face of said circular member is formed with a groove adjacent the abutment zone, the depth of said groove in said circular member being such as to enable said circular member to be introduced into said cylindrical member with said resilient ring retained on its compressed condition in said groove of said circular member.

3. An assembly as claimed in claim 1, wherein said cylindrical member is formed with a further groove and a second portion of the peripheral surface of said circular member adjacent the other end face of said circular member is formed with an axially open recess, the assembly comprising a ring gasket received in said further groove of said cylindrical member and projecting inwardly of the internal surface of said cylindrical member for engagement in said recess of said circular member.

4. An assembly as claimed in claim 3, wherein said circular member has a chamfer at the open axial end of said recess of said second peripheral surface portion to facilitate engagement of said ring gasket in said recess on introduction of said circular member into said cylindrical member.

5. An assembly as claimed in claim 4, wherein said chamfer of said circular member is frustoconical in shape.

6. An assembly as claimed in claim 1, wherein said abutment zone of the peripheral surface of said circular member is constituted by a frustoconical surface of said peripheral surface.

7. A variable-speed device comprising a cylindrical member having an internal surface formed with an annular groove and with splines; a driving shaft extending axially into said cylindrical member and provided with splines; a driven shaft connected to said cylindrical member for rotation with said cylindrical member; a plurality of conical discs engaged with the splines of said driving shaft for rotation with said driving shaft; a plurality of annular rings engaged with the splines of said cylindrical member, said conical discs and annular rings being disposed within said cylindrical member in alternate relationship to form a stack of variable thickness; a circular discoid member received in said cylindrical member at one end of said stack of discs and rings, said circular member having two end faces and a peripheral surface formed with an abutment zone and with splines co-operating with the splines of said cylindrical member; a resilient split ring received in the groove of said cylindrical member and projecting inwardly of the internal surface of said cylindrical member for engagement with the abutment zone of the peripheral surface of said circular member to retain said circular member against an axial force applied thereto in one direction while permitting axial displacement of said circular member in the other direction by a sufficient opposing axial force acting in said other direction, said resilient ring being disposed completely between the end faces of said circular member when said resilient ring is in engagement with the abutment zone of the peripheral surface of said circular member; and resilient biasing means exerting an axial force in said one direction to clamp said stack of discs and rings against said circular member; in which device the improvement comprises: said circular member having a first peripheral surface portion which has a diameter less than the internal diameter of said resilient ring when said ring is received in the annular groove of said cylindrical member and at least equal to the internal diameter of said resilient ring when said ring is in a compressed condition for introduction into said cylindrical member, said first peripheral surface portion being disposed between the abutment zone and the end face of said circular member which is on the axial side of said resilient ring remote from the abutment zone; the splines of said circular member are formed on a second peripheral surface portion of said circular member between said abutment zone and the other end face of said circular member; and said circular member being axially displaceable relative to said cylindrical member in said other axial direction against the action of said resilient biasing means by an amount enabling said resilient ring to be retracted radially inwardly of said cylindrical member out of the annular groove of said cylindrical member.

* * * * *